United States Patent
Chang et al.

(10) Patent No.: US 6,266,375 B1
(45) Date of Patent: Jul. 24, 2001

(54) METHOD AND APPARATUS FOR SELECTING A QUANTIZATION TABLE FOR ENCODING A DIGITAL IMAGE

(75) Inventors: Ching-Fang Chang, San Jose; Chuen-Chien Lee, Fremont, both of CA (US); Naofumi Yanagihara, Tokyo (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 08/970,116

(22) Filed: Nov. 13, 1997

(51) Int. Cl.[7] .................................................. H04N 7/30
(52) U.S. Cl. ................................. 375/240.3; 375/240.22
(58) Field of Search ........................... 348/405; 382/253; 375/240.3, 240.4, 240.5, 240.22

(56) References Cited

U.S. PATENT DOCUMENTS

| | | | |
|---|---|---|---|
| 5,398,069 | * 3/1995 | Huang et al. ........................ | 348/422 |
| 5,404,168 | * 4/1995 | Yamada et al. ...................... | 348/403 |
| 5,436,985 | * 7/1995 | Li ......................................... | 382/253 |
| 5,444,488 | * 8/1995 | Goubault et al. .................... | 348/414 |
| 5,450,132 | * 9/1995 | Harris et al. ......................... | 348/418 |
| 5,943,446 | * 8/1999 | Pulsipher et al. .................... | 348/405 |

* cited by examiner

*Primary Examiner*—Chris Kelley
(74) *Attorney, Agent, or Firm*—Blakely, Sokoloff, Taylor & Zafman LLP (57) ABSTRACT

A method and apparatus for selecting a quantization table containing quantization coefficients for encoding image data. A set of quantization tables is examined to determine a quantization table which meets a predetermined selection criteria. If such a quantization table is not the first table examined, other tables in the vicinity of a neighborhood of tables are examined utilizing linear searching techniques. If a quantization table which meets the selection criteria is not determined in the vicinity of the neighborhood of tables, quantization tables outside the vicinity of the neighborhood of tables are examined utilizing binary searching techniques.

32 Claims, 7 Drawing Sheets

ROW 311 →
COLUMN 312 ↓

|   | 0 | 1 | 2 | 3 | 4 | 5 | 6 | 7 |
|---|---|---|---|---|---|---|---|---|
| 0 | 0 | 0 | 0 | 1 | 1 | 1 | 2 | 2 |
| 1 | 0 | 0 | 1 | 1 | 1 | 2 | 2 | 2 |
| 2 | 0 | 1 | 1 | 1 | 2 | 2 | 2 | 3 |
| 3 | 1 | 1 | 1 | 2 | 2 | 2 | 3 | 3 |
| 4 | 1 | 1 | 2 | 2 | 2 | 3 | 3 | 3 |
| 5 | 1 | 2 | 2 | 2 | 3 | 3 | 3 | 3 |
| 6 | 2 | 2 | 2 | 3 | 3 | 3 | 3 | 3 |
| 7 | 2 | 2 | 3 | 3 | 3 | 3 | 3 | 3 |

*FIG. 5A*

| QUANTIZATION TABLE NUMBER | AREA IDENTIFICATION NUMBER ||||
|---|---|---|---|---|
|  | 0 | 1 | 2 | 3 |
| 15 | 1 | 1 | 1 | 1 |
| 14 | 1 | 1 | 1 | 1 |
| 13 | 1 | 1 | 1 | 1 |
| 12 | 1 | 1 | 1 | 1 |
| 11 | 1 | 1 | 1 | 1 |
| 10 | 1 | 1 | 1 | 1 |
| 9  | 1 | 1 | 1 | 1 |
| 8  | 1 | 1 | 1 | 2 |
| 7  | 1 | 1 | 2 | 2 |
| 6  | 1 | 1 | 2 | 2 |
| 5  | 1 | 1 | 2 | 4 |
| 4  | 1 | 2 | 2 | 4 |
| 3  | 2 | 2 | 4 | 4 |
| 2  | 2 | 2 | 4 | 4 |
| 1  | 2 | 4 | 4 | 8 |
| 0  | 2 | 4 | 4 | 8 |

METHOD AND APPARATUS FOR SELECTING A QUANTIZATION TABLE FOR ENCODING A DIGITAL IMAGE

FIELD OF THE INVENTION

The present invention relates to the field of encoding of digital images. More particularly, the present invention relates to the quantization of pixels of digital images.

BACKGROUND

The need to compress digital image data, whether static or dynamic images (i.e., video images) has dramatically increased. In particular, digital video data creates among the largest amounts of data utilized. For example, a single 8.5×11 inch, 24-bit color image at 100 dots-per-inch, is made up of over 22 million pixels of data. Data compression is utilized in multimedia computer systems, as well as in digital video devices (i.e., digital video camcorders, DVD) players, and digital still image cameras) to reduce memory requirements. The popularity of these digital devices has increased dramatically. In addition, compression is used to transmit digital broadcasts such as direct satellite broadcasts and High Definition Television (HDTV).

Typically, digital image data is transmitted or stored in a compressed format and decompressed prior to the display of the image. Examples of widely used compression techniques are those that comply with MPEG, MPEG-2 (Moving Pictures Expert Group), DV and JPEG point Photographic Experts Group) standards.

Given digital image data to be compressed, an encoder follows an ordered set of steps called an encoding process. The encoding process is not standardized, and typically varies as encoders of different complexities can be used in different applications. Many encoding processes (including those that comply with MPEG, MPEG-2, DV or JPEG standards) utilize quantization procedures to reduce storage requirements of digital image data and regulate its output bandwidth.

The process of quantization typically begins with the selection of a quantization table from a set of quantization tables. Each quantization table contains a set of quantization steps. The actual quantization process itself is well known and will not be discussed in detail herein. However, as a result of the quantization process, the size of image data representing the unquantized image is reduced. Furthermore, the size of the quantized data can be varied according to the quantization table selected. For example, the smaller the magnitude of a table's quantization steps, the greater the size of the quantized data used to represent the unquantized digital image. Similarly, the larger the magnitude of a table's quantization steps, the smaller the size of the quantized data used to represent the unquantized digital image. In other words, if a smaller image data size is required, quantization steps of larger magnitudes are used. Analogously, if a larger image data size is desired, quantization steps of smaller magnitude are utilized. For further information, see *Introduction To Data Compression,* Sayood, 1996, pages 169–254.

A problem with conventional quantization table selection techniques is when delays are introduced by the encoder when selecting a quantization table to utilize. For example, bursty delay may cause time latency. In addition, a constant delay by the encoder may cause the encoder to fail in real-time encoding.

A number of different searching techniques can be used to locate a quantization table, including linear and binary searching techniques. A linear search simply starts at a first location in a list of quantization tables and searches sequentially until the object of interest, i.e., a quantization table, is located. The amount of time required to perform a linear search is proportional to the size of a list. In contrast, a binary search technique assumes that the collection of elements has been ordered. An object at the center of the tree (identified as a root node) is selected and the relationship of that object to the object being sought is determined. If the object precedes or follows the object being sought, the results are used to bisect the search range and recursively continue the process. The amount of time required to perform a binary search is proportional to the height of the tree.

Although each of these searching techniques are useful, each has advantages and drawbacks. For example, a linear searching technique is fast when the object of interest is located near the starting point in the list since only a small number of comparisons need to be performed to locate it. However, in a worst case, when the object of interest is at the end of the list, the entire list must be traversed before the object is located. Additionally, although binary searching techniques typically provide an efficient method for searching large databases of objects (since the search space is cut in half during each iteration), such techniques are not as efficient when the object of interest is located close to the starting point of the search. In sum, the sole use of either searching technique to locate a quantization table containing quantization steps of desired magnitude can introduce delays into a digital device's data transmission rate. For the foregoing reason, there is a need for a methodology to rapidly locate a quantization table containing quantization steps of a desired magnitude.

SUMMARY

The disclosed method and apparatus of the invention provide hybrid searching techniques that minimize the time required for determining a quantization table used in an encoding process.

A neighborhood of tables, which is a subset of a set of quantization tables is defined. During a quantization table search process, a next table to be examined is selected using a first search methodology if a previously examined table is in vicinity of the neighborhood of tables and using a second search methodology if the previously examined table is not in the vicinity of the neighborhood of tables.

In one embodiment, the first searching methodology is defined as a linear searching technique and the second search methodology is defined as a binary searching technique.

Other objects, features and advantages of the invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
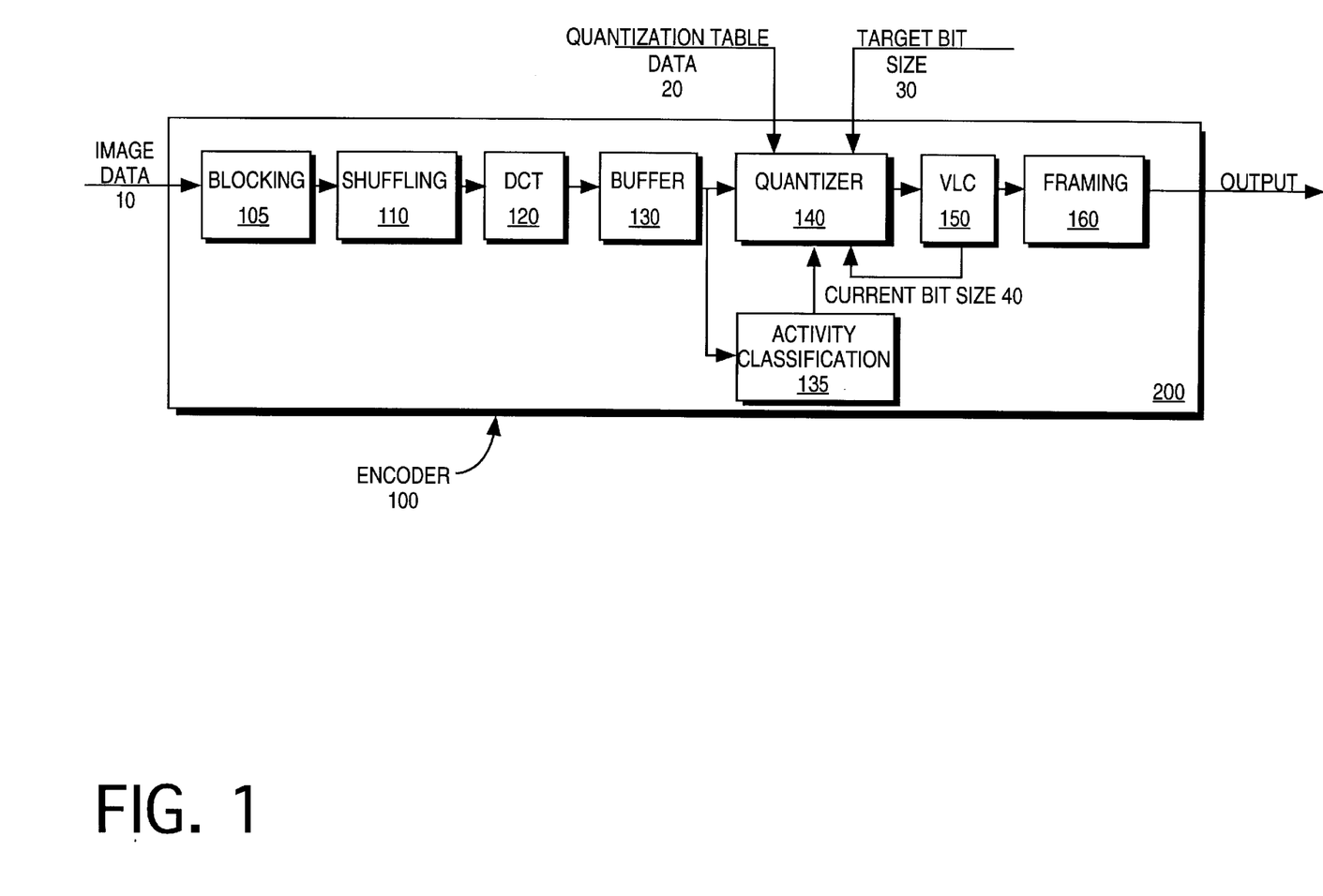
FIG. 1 shows a block diagram of an encoder that operates in accordance with the teachings of the present invention.

FIG. 1 shows a simplified block diagram of an encoder 100 that includes a quantizer 140 that operates in accordance with the teachings of the present invention. The encoder 100 includes logic to compress image data 10, including the following: blocking logic 105, shuffling logic 110, discrete cosine transform (DCT) logic 120, quantization logic 140, variable length coding (VLC) logic 150, and framing logic 160. It should be realized that the encoder generally illustrated by FIG. 1 is exemplary, and a variety of encoders can be configured in accordance with the teachings of the present invention.

The image data received is broken down into blocks by blocking logic 105. In one embodiment, image data 10 is broken down into 8×8 blocks of image data. Shuffle logic 110, shuffles, or reorders the blocked data to enhance the uniformity of image quality. Such techniques for shuffling are known in the art and will not be discussed further herein. A discrete cosine transform (DCT) 120 is applied to the reordered data to transform it from a spatial domain to a frequency domain. The transformed data is stored in a buffer 130. Activity classifier 135 detects the level of activity in the image. This is used by the quantizer 140 to identify the set of quantization tables to search. The quantizer 140 selects a quantization table containing a set of quantization steps, and applies a corresponding quantization step to the DCT coefficients of the transformed data stored in the buffer 130. The quantization table is selected from the set of tables, provided via input 20, identified by the class of activity provided by activity classifier 135. The quantized data is variable length coded (VLC) by coder 150. The current bit size 40 of VLC coded quantized data is sent back to quantizer 140. The table selected is the table which generates VLC coded quantized data that best meets the target bit rate 30. Framing logic 160 assembles the VLC data into many video segments.

Increased efficiency in the encoder can be realized by shortening the amount of time needed by the quantizer to determine the quantization table. The system of the present invention includes an innovative mechanism to rapidly select a quantization table.

Figure 2:
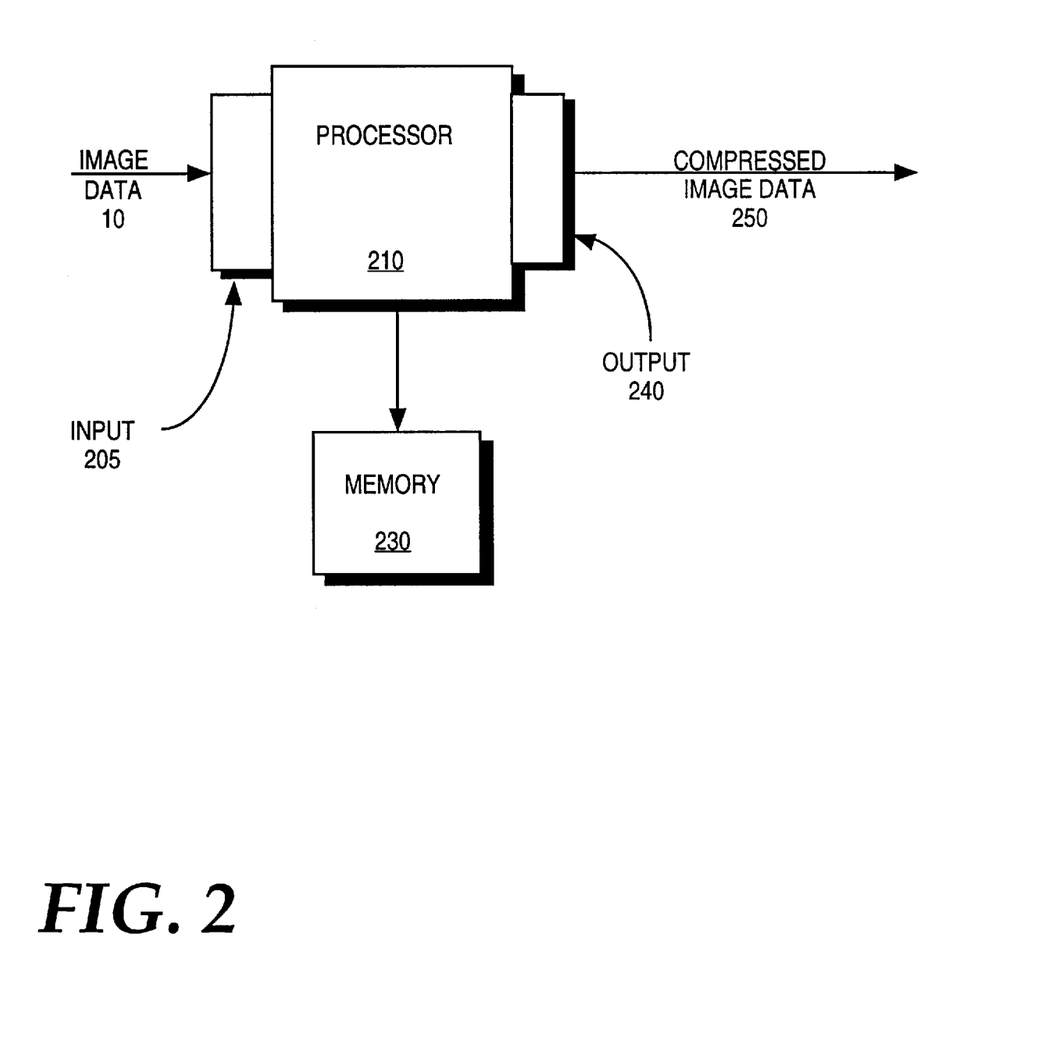
FIG. 2 shows a block diagram of an illustrative processor system that operates in accordance with the teachings of the present invention.

FIG. 2 shows a block diagram of an illustrative processor system which performs quantization in accordance with one embodiment of the present invention. The system includes input port circuitry 205, a processor subsystem 210, memory 230, and output port circuitry 240.

The processor subsystem 210 executes instructions retrieved from memory, such as memory 230, to perform steps to select a quantization table containing quantization steps of a desired magnitude. Preferably, the quantization tables are stored in a memory such as memory 230. It is contemplated in this embodiment that the processor 210 would perform all, or a portion, of the encoding process described below to generate an encoded image as output.

Figure 3:
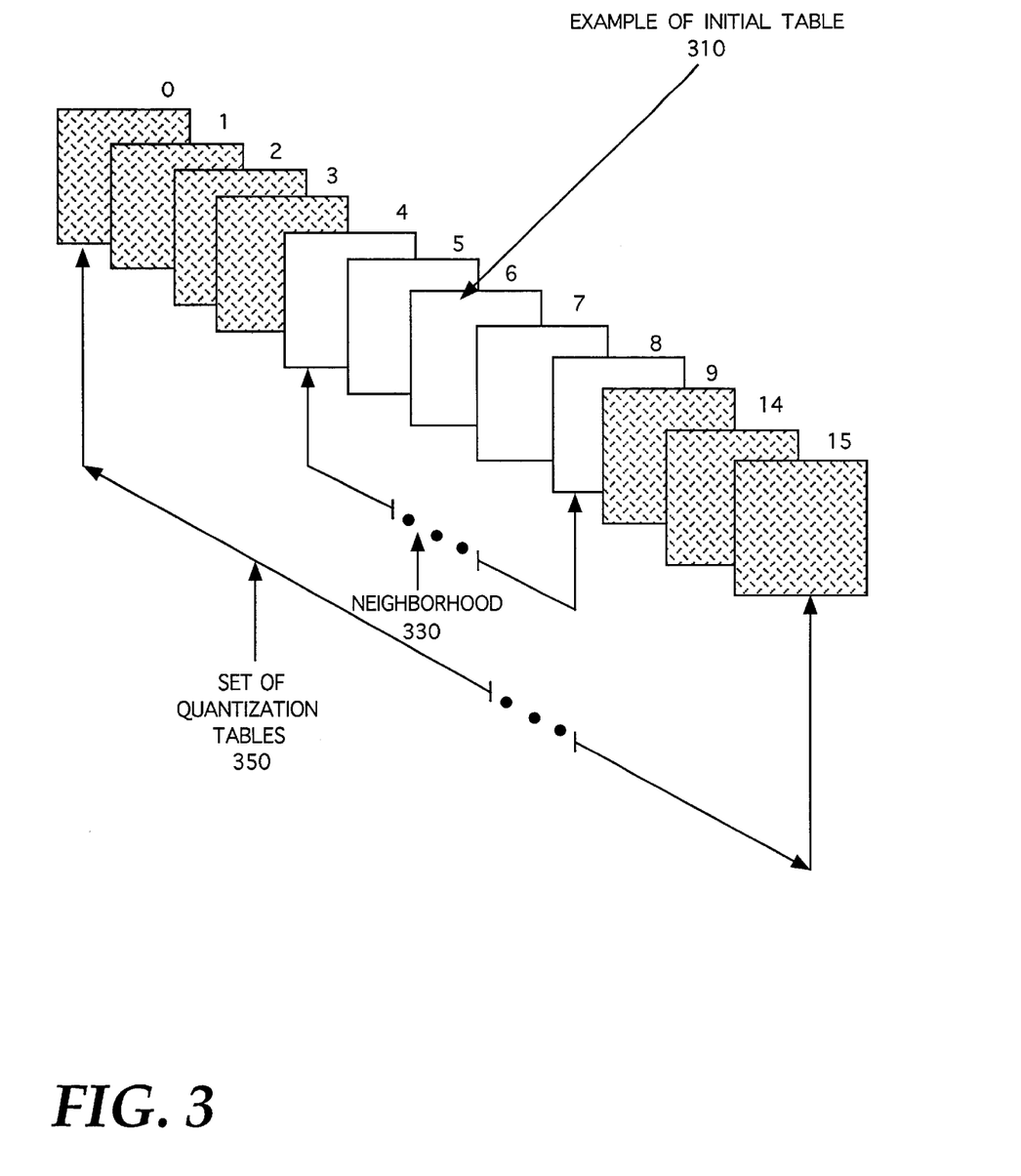
FIG. 3 illustrates an exemplary organization of a set of quantization tables.

FIG. 3 visually depicts the organization of a set of quantization 350 tables in accordance with the teachings of the present invention. A set of quantization tables 350 are available to quantize image data. Preferably the quantization tables are ordered according to the quantization granularity associated with each table; more particularly, tables are ordered in accordance with relative values of the quantization steps contained in each table.

Within the set of quantization tables 350, an initial table 310 and a neighborhood of tables 330 are identified. The initial table 310 is the first table examined in the table selection process. In one embodiment, the initial table is a prespecified table, e.g., a table at the midpoint of the set of tables. Furthermore, in embodiment that includes 0–15 tables, table 310 is set as the initial table. Alternately the initial table identified can be varied. For example, it is contemplated that the initial table is set to the median table among the tables selected to quantize prior images or portions of prior images.

The number of tables in a set and the number of tables in a neighborhood can be varied according to application. In one embodiment the number of tables in a set is 16 and the number of tables within a neighborhood is 5. The criteria used may also vary according to application. In one embodiment, the most frequently used tables are empirically determined and a neighborhood is selected based on the determination. It is further contemplated that the location of the neighborhood need not be fixed and can be varied in view of tables selected during encoding of prior images or portions of images. Furthermore, the neighborhood of tables is typically selected to include the initial table. However, it is contemplated that it is not required that the initial table be located within the neighborhood of tables.

Figure 4:
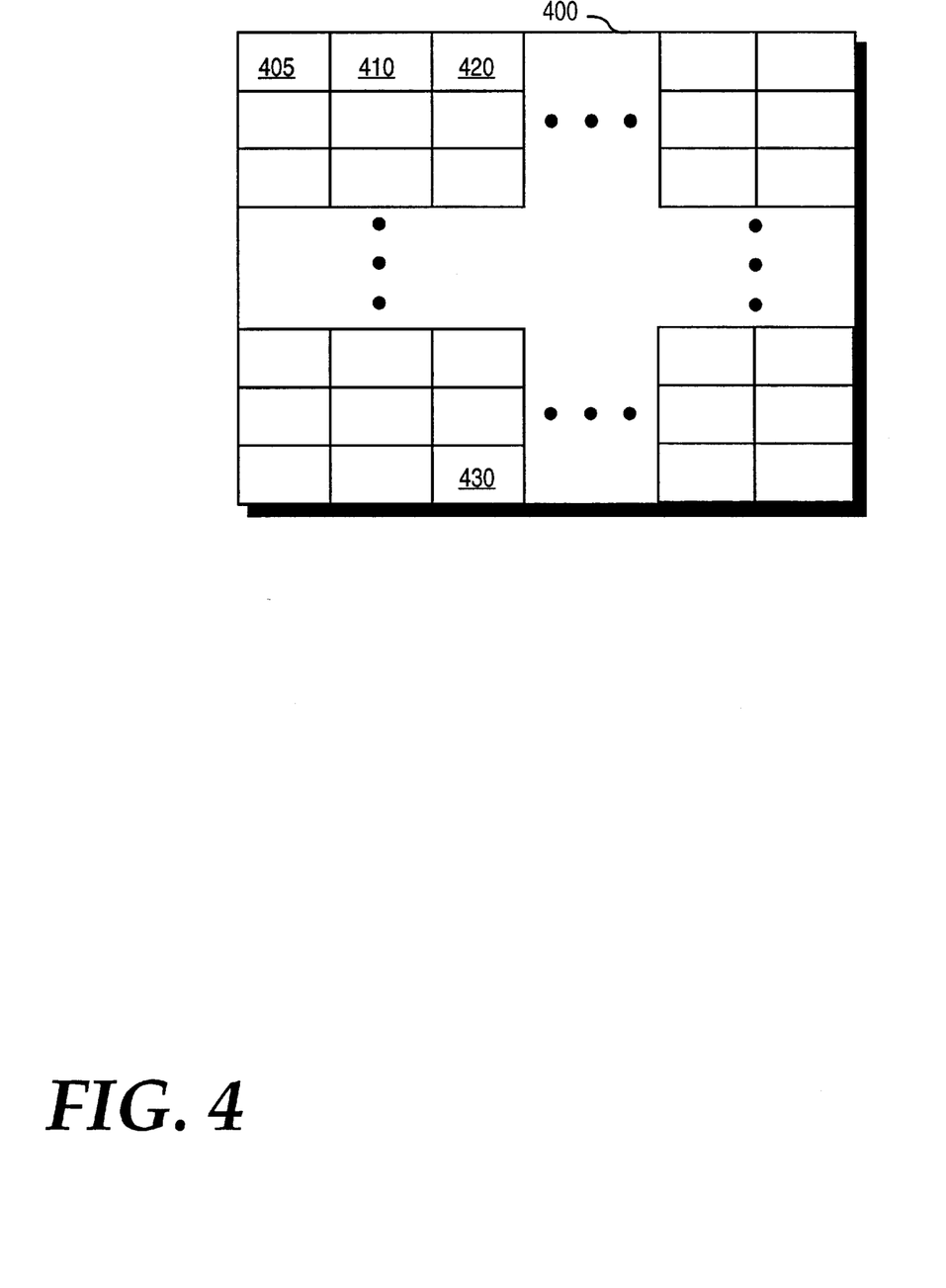
FIG. 4 illustrates blocks in a digital image.

FIG. 4 shows an illustrative image 400 broken down into a plurality of blocks, e.g., blocks 405,410,420,430 in the spatial domain. Although the size of a block can vary, in the present embodiment each block is an 8×8 array of image data. The blocks are transformed into the frequency domain by application of a discrete cosine transform.

Figure 5A:
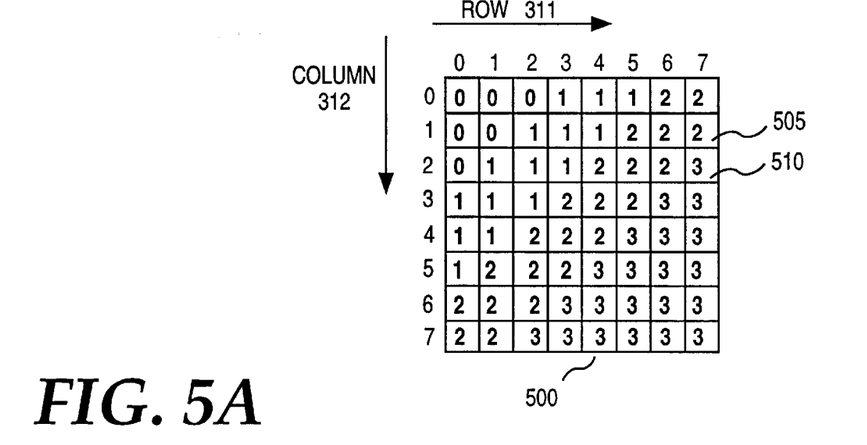
FIG. 5A illustrates one embodiment in which blocks in a digital image are assigned "areas" by a transform encoding process.
Figure 5B:
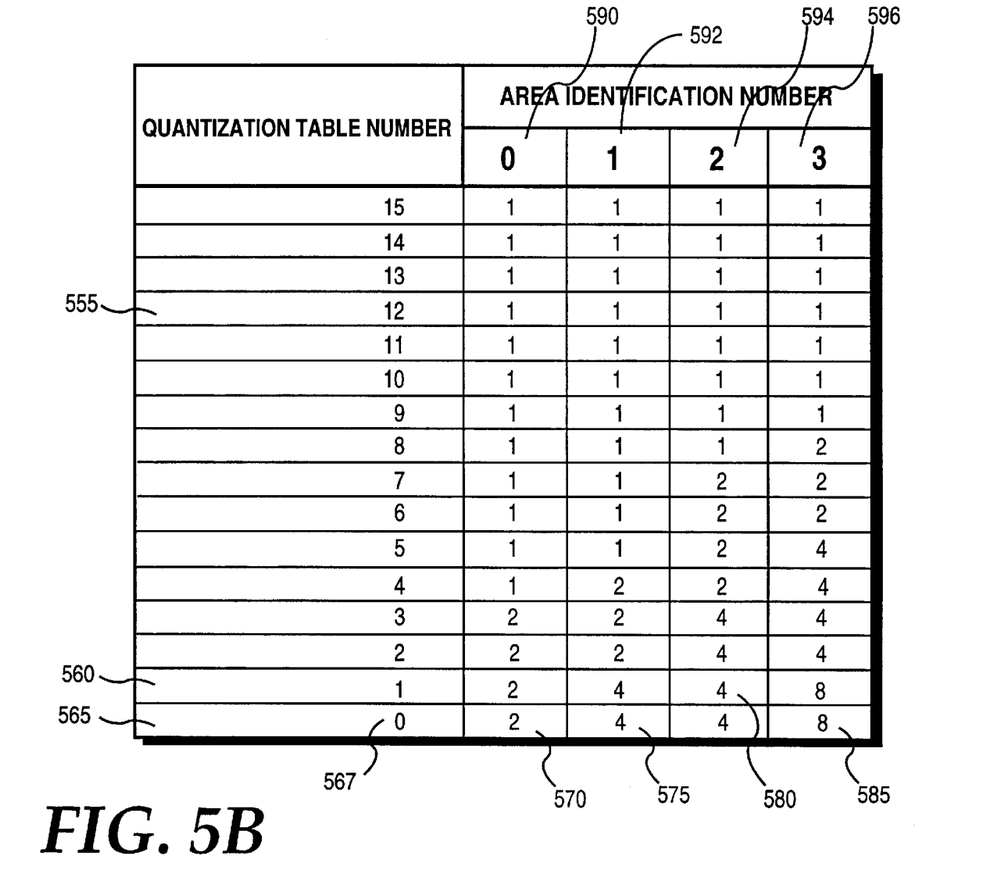
FIG. 5B illustrates an exemplary set of quantization tables that are selected according to the assigned areas.

In the present embodiment, each transformed block is divided into "areas" as shown in FIG. 5A. Each location in the transformed block, e.g., 505, 510, corresponding to a DCT coeffcient is associated with a particular area identification number, e.g., area 2 or area 3. As noted earlier, the input image is classified according to the activity level measured. In one embodiment four classes are provided. Each class identifies a set of quantization tables. FIG. 5B is representative of one set of quantization tables associated with one class. It should be realized that quantization tables can be embodied a variety of ways and the present invention is not limited to the form of the quantization table used.

Referring to FIG. 5B, each table, e.g., 565, is identified by a quantization table number 567 and specifies a set of quantization steps 570, 575, 580, 585 that correspond to the area identification number; e.g., 590, 592, 594, 596. The quantization step corresponding to a particular area identification number is used to quantized those areas of the transformed image identified by that area identification number.

One embodiment of the present invention contemplates quantizing image data on a macroblock by macroblock basis, where in each macroblock contains six (6) 8×8 blocks of image data. It should be realized that image data can be quantized in a variety of ways and the present invention is not limited to the size of the compression unit utilized.

Figure 6:
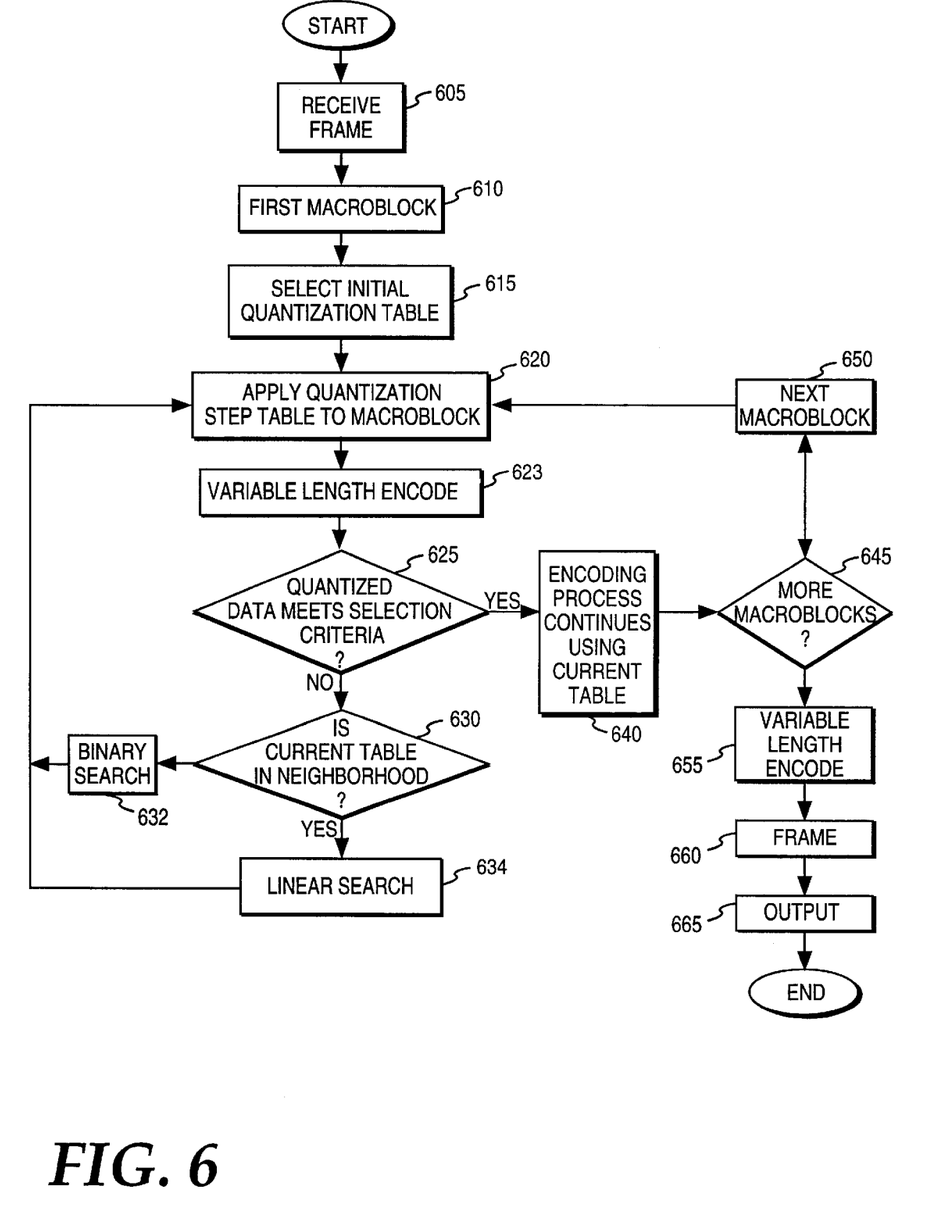
FIG. 6 is a flow diagram of one embodiment of the method of the invention.

One embodiment of the process of the present invention is now described with reference to FIG. 6. In the embodiment described below, the image data is quantized on a macroblock by macroblock basis. However, the process of the present invention is applicable to processing on a plurality of images, per image, per block, or per compression unit basis. In addition, it is contemplated that although a quantization table can be determined from data processed on the above noted basis, the selected table can be applied to the same quantity or different quantity of data. For example, the quantization table may be selected based on a macroblock of data and applied to a frame of data. Alternately, for example, each macroblock could use a different quantization table.

At step 605, image data is received. At step 610, a first macroblock of data is referenced. An initial quantization table to examine is selected, step 615, and each data element of the first macroblock is quantized using the selected quantization table, step 620. At step 625, it is determined if the quantized data meets a selection criteria. In the present embodiment the selection criteria is determined by: dividing the DCT coefficients of the transformed image data by a corresponding quantization step resulting in quantized data. The quantized data are encoded, step 623, by a variable length encoder resulting in a quantized data size; and, if the quantized data size is the largest quantized data size less than or equal to a predetermined target data size, the selection criteria is met. However, it is contemplated that although a selection criteria can be determined from data operated upon in the above noted basis, the selection criteria can be determined in other ways. For example, the selection criteria may be a target data size determined during run-time, or it may be a variable target data size.

If the earlier noted selection criteria is not met, at step 625, a search is performed to select, at step 630, a next quantization table to examine by determining if an immediately previous examined quantization table was in the neighborhood of tables, step 630. If so, a linear searching technique is selected to locate a next quantization table, step 634. If it is determined, at step 630, that the immediately previous examined quantization table was not in the neighborhood, at step 630, a binary searching technique is selected to locate the next quantization table, step 632. The process continues at step 620, where the quantization process is repeated using the newly selected quantization table.

At step 625, if it was determined that the macroblock's quantized value meets the selection criteria, the encoding process of the image data continues utilizing the currently selected quantization table to quantize a next macroblock of image data. At step 645, it is determined whether additional macroblocks need to be quantized in the current image frame; if additional macroblocks need to be quantized, at step 650, the next macroblock of the image is referenced. At step 620, the encoding process continues as earlier described. The quantized values are then utilized to subsequently variable length encoded, step 655, and framed, step 660, for output, step 665.

Figure 7:
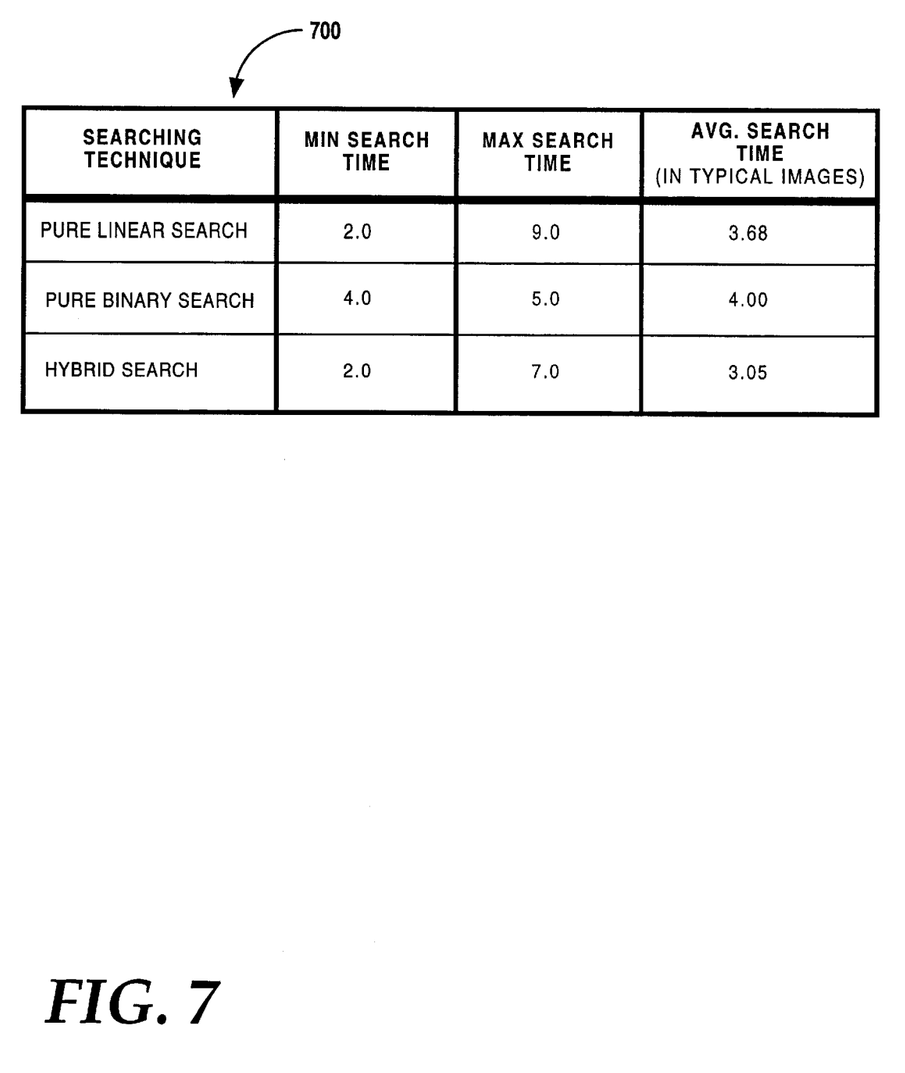
FIG. 7 is a table that illustrates timing advantages of the present invention over conventional quantization table selection techniques.

The previously described embodiments of the present invention have many advantages. In particular, distinct timing advantages are realized following the teachings of the present invention over conventional quantization table selection techniques. FIG. 7 illustrates the timing advantages of the invention, wherein is shown the time taken to locate a quantization table within a set of quantization tables by performing: a pure linear search; a pure binary search; and, as contemplated by the invention, a hybrid searching technique. As noted earlier, the linear searching technique chooses the quantization table immediately next to the currently selected quantization table in an ordered set of quantization tables. The binary searching technique chooses the quantization table half way between the currently selected quantization table and the end of the ordered set of quantization tables. The direction of the search is determined by the relative value of the quantized data and the selection criteria. As can be seen by reference to FIG. 7, the hybrid search technique of the present invention shows distinct time savings.

In the foregoing specification, the invention has been described with reference to specific exemplary embodiments thereof. It will, however, be evident that various modifications and changes may be made thereto without departing from the broader spirit and scope of the invention as set forth in the appended claims. For example, whereas the foregoing description of the present invention selects quantization tables to encode image data, the present invention further contemplates the utilization of the invention as disclosed to apply to other types of data. The specification and drawings are, accordingly, to be regarded in an illustrative rather than a restrictive sense.

What is claimed is:

1. A method for searching for a quantization table of a set of quantization tables comprising the steps of:
   initially selecting an initial table as the currently selected quantization table;
   wherein the initial table is determined as an average of the quantization tables utilized for previously encoded images;
   if a currently selected quantization table is in a vicinity of a neighborhood of tables, using a first search methodology to search for a next selected quantization table; and
   if a currently selected quantization table is not in the vicinity of a neighborhood of tables, using a second search methodology to search for a next selected quantization table.

2. The method as set forth in claim 1, wherein the steps of using a first search methodology and using a second search methodology are performed if the currently selected quantization table does not meet a selection criteria.

3. The method as set forth in claim 1, wherein the neighborhood is a subset of the set of quantization tables and the vicinity is within the subset of tables.

4. The method as set forth in claim 1, wherein each quantization table comprises a set of quantization coefficients and the set of quantization tables is sequentially organized according to the relative magnitudes of each table's set of quantization coefficients.

5. The method as set forth in claim 2, wherein the selection criteria is an encoded image data size.

6. The method as set forth in claim 2, further comprising the step of determining if the currently selected quantization table meets a selection criteria.

7. The method as set forth in claim 6, where step of determining comprises the steps of:
   quantizing input image data using the currently selected table, resulting in quantized image data;
   variable length encoding the quantized image data; and comparing the size of the encoded image data to the selection criteria.

8. The method as set forth in claim 1, wherein the first search methodology is a linear searching process and the second search methodology is a binary searching process.

9. The method as set forth in claim 1, wherein the initial table is a predetermined table within the neighborhood of tables.

10. The method as set forth in claim 7, wherein the step of quantizing the image data comprises quantizing coefficients of transformed image data.

11. An apparatus comprising:
a set of quantization tables;
a processor coupled to the set of quantization tables and coupled to receive image data;
wherein the processor is configured to select an initial table as the currently selected quantization table;
wherein the processor is configured to determine the initial table as an average quantization table of quantization tables utilized to encode previously encoded images;
the processor configured to search for a quantization table of the set of quantization tables, wherein if a currently selected quantization table is in a vicinity of a neighborhood of tables,
using a first search methodology to search for a next selected quantization table, and
if a currently selected quantization table is not in the vicinity of a neighborhood of tables, using a second search methodology to search for a next selected quantization table.

12. An apparatus for encoding an image comprising:
a input coupled to receive image data; and
a quantizer coupled to receive image data,
wherein the quantizer is configured to select an initial table, said initial table selected as an average quantization table of quantization tables utilized to encode prior image data;
said quantizer configured to identify a quantization table from a set of quantization tables to quantize the image data,
said quantizer configured to determine if a currently selected quantization table meets a selection criteria and select a next quantization table and if the currently selected quantization table does not meet the selection criteria,
said quantizer configured to select a next quantization table by searching for a quantization table of the set of quantization tables, wherein if the currently selected quantization table is in a vicinity of a neighborhood of tables,
using a first search methodology to search for the next quantization table, and
if the currently selected quantization table is not in the vicinity of a neighborhood of tables, using a second search methodology to search for the next quantization table, and if the currently selected quantization table meets the selection criteria, encoding the image using the currently selected quantization table.

13. A computer readable medium containing executable instructions which, when executed by a processing system, causes the system to perform the steps for selecting a quantization table for encoding image data, comprising:

selecting an initial table;
wherein selecting an initial table selects an average quantization table of quantization tables utilized to encode prior portions of the image data;
if a currently selected quantization table is in a vicinity of a neighborhood of tables, using a first search methodology to search for a next selected quantization table; and
if a currently selected quantization table is not in the vicinity of a neighborhood of tables, using a second search methodology to search for a next selected quantization table.

14. The apparatus as set forth in claim 11, wherein the processor is further configured to search for the next quantization table if the currently selected quantization table does not meet a selection criteria.

15. The apparatus as set forth in claim 11, wherein the neighborhood is a subset of the set of quantization tables and the vicinity is within the subset of tables.

16. The apparatus as set forth in claim 14, wherein the selection criteria is a predetermined encoded image data size.

17. An apparatus as set forth in claim 11, wherein each quantization table comprises a set of quantization coefficients and the set of quantization tables is sequentially organized according to the relative magnitudes of each table's set of quantization coefficients.

18. The apparatus as set forth in claim 11, wherein the processor is further configured to determine if the currently selected quantization table meets a selection criteria.

19. An apparatus as set forth in claim 18, wherein the processor is configured to determine if the currently selected table meets the selection criteria by quantizing the image data using the currently selected table variable length encoding the quantized image data, and comparing a size of the quantized image data to the selection criteria.

20. The method as set forth in claim 19, wherein the processor is configured to quantize the image data by quantizing coefficients of transformed image data.

21. The apparatus as set forth in claim 11, wherein the first search methodology is a linear searching process and the second search methodology is a binary searching process.

22. The apparatus as set forth in claim 13, wherein the initial table is a quantization table in the neighborhood of tables.

23. The encoder as set forth in claim 12, wherein the encoder further comprises a discrete cosine transform (DCT) coupled between the input and the quantizer, said DCT configured to transform the image data, said quantizer configured to quantize the DCT coefficients.

24. The encoder as set forth in claim 12, further comprising blocking logic coupled between the input and the quantizer, said blocking logic configured to group the image data into blocks.

25. The apparatus as set forth in claim 12, wherein the neighborhood is a subset of the set of quantization tables and the vicinity is within the subset of tables.

26. The apparatus as set forth in claim 12, wherein the first search methodology is a linear searching process and the second search methodology is a binary searching process.

27. The computer readable medium as set forth in claim 13, further containing instructions to determine if the currently selected quantization table does not meet a selection criteria and to execute the instructions of using a first search methodology and using a second search methodology if the currently selected quantization table does not meet the selection criteria.

28. The computer readable medium as set forth in claim 13, wherein the neighborhood is a subset of the set of quantization tables and the vicinity is within the subset of tables.

29. The computer readable medium as set forth in claim 27, wherein the selection criteria is an encoded image data size.

30. The computer readable medium as set forth in claim 27, further containing instructions to quantize the image data using the currently selected table and compare a size of the quantized image data to the selection criteria to determine if the currently selected quantization table meets the selection criteria.

31. The computer readable medium as set forth in claim 13, wherein the first search methodology is a linear searching process and the second search methodology is a binary searching process.

32. The computer readable medium as set forth in claim 13, further containing instructions to quantize the image data by quantizing coefficients of transformed image data.

* * * * *